(No Model.)
O. C. ROSS.
FELLY CONNECTION FOR VEHICLE WHEELS.
No. 254,162. Patented Feb. 28, 1882.
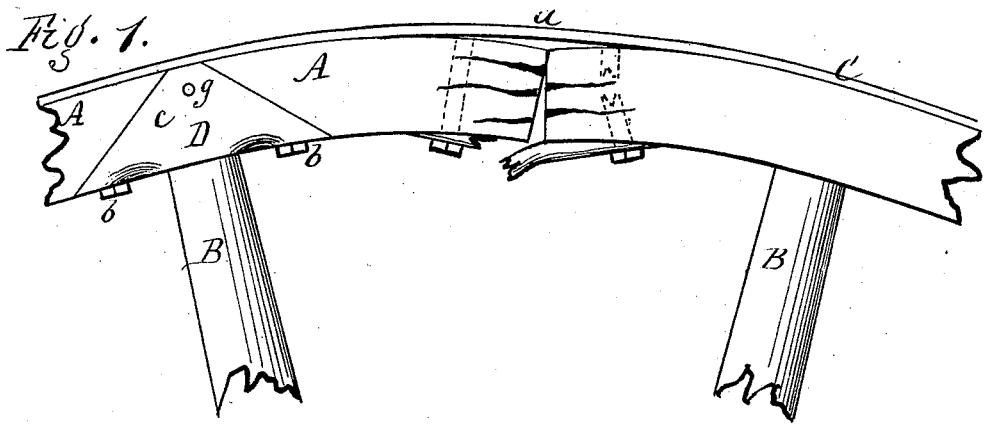
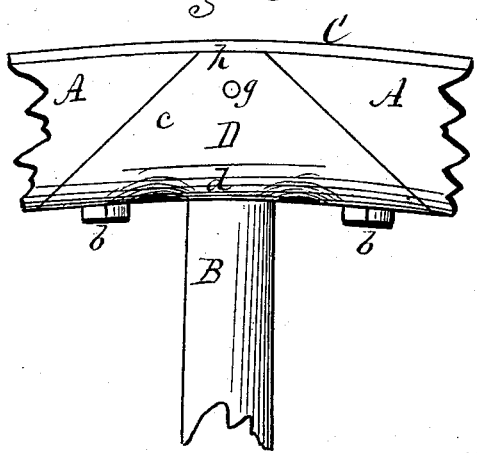
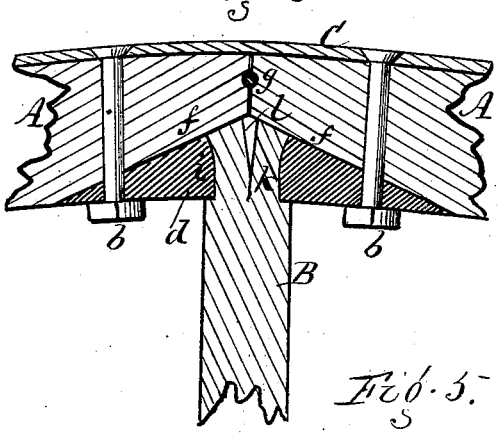
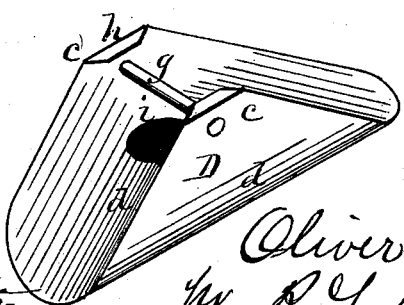
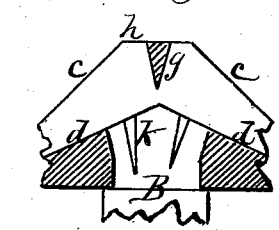
Attest.
H E Shaffer
A. D. McMaster
Inventor.
Oliver C. Ross,
per R. L. Osgood
atty

UNITED STATES PATENT OFFICE.

OLIVER C. ROSS, OF PENFIELD, NEW YORK.

FELLY-CONNECTION FOR VEHICLE-WHEELS.

SPECIFICATION forming part of Letters Patent No. 254,162, dated February 28, 1882.

Application filed January 20, 1882. (No model.)

*To all whom it may concern:*

Be it known that I, OLIVER C. ROSS, of Penfield, Monroe county, New York, have invented a certain new and useful Improvement in Carriage-Wheels; and I do hereby declare that the following is a full, clear, and exact description of the same, reference being had to the accompanying drawings, in which—

Figure 1 is an elevation of the rim of a wheel showing my improvement. Fig. 2 is a similar view enlarged. Fig. 3 is a longitudinal vertical section of Fig. 2. Fig. 4 is a perspective view of the felly plate or clip. Fig. 5 is a modification.

My improvement relates to felly plates or clips for connecting and holding the meeting ends of fellies. In common carriage-wheels the ends of the felly rest between two of the spokes, as shown at a, Fig. 1. The clip is very liable to break at this point and the felly to yield and split. To obviate this difficulty spoke-sockets have been employed which span the felly-joint, the spoke resting under and supporting the joint. This is objectionable, as it is insecure, and the socket which takes the tenon projects outward and is unsightly, and much strain comes on the tenon.

My invention consists of a felly plate or clip for the meeting ends of the felly, constructed, arranged, and operating as hereinafter described.

In the drawings, A A indicate the two meeting ends of the felly.

B B are the spokes, and c is the tire.

D is the felly plate or clip, which spans the joint of the felly, and is secured to the two meeting ends by bolts b b in the usual manner. It consists of two sharp-edged flanges, c c, which clasp the opposite sides of the felly, and a body portion, d, which in longitudinal vertical section is thin at the outer ends, but is thick in the center, being of blunt wedge form, as shown in the sectional view, Fig. 3. The center of the plate occupies nearly or quite half the vertical thickness of the felly, and the ends of the felly, in order to meet the inclines of the wedge, are beveled off or chamfered on the inner sides, as shown at f f, forming a cavity or depression in the wood that takes in the wedge of the plate. A cross-rivet, g, passes through the two flanges and the felly, and is headed down at the opposite ends.

If desired, a cross-bar may be cast with the plate, extending from side to side, as shown in Fig. 5, and used in place of the rivet; but the rivet is preferable. The whole plate, including the wedging-body and the flanges, is sunken into the wood in such a manner as to avoid any square shouldering of the wood, forming a neat and complete finish, corresponding with the entire felly, thereby avoiding all surface appliances—such as projecting felly-plates—and enabling the wheel to be made much lighter and stronger. The tops of the flanges c c extend very near or quite to the inner face of the tire, and at that point are squared off, as shown at h.

The center or thick portion of the plate is provided with a hole, i, which is enlarged or dovetailed on its inner longitudinal sides, in which hole the tenon k of the spoke is inserted, and is then expanded or spread by means of a wooden wedge, l, which is driven therein and glued in place, forming a strong and perfect dovetail. This hole being formed in the thick central portion, it has sufficient length to give proper support to the tenon, and by this means the projecting outside socket, such as is ordinarily employed, is avoided. The whole tenon rests within the body of the plate, and thus obtains a bearing therein within the line of the body of the felly.

By the peculiar construction of the felly-plate as above described, its exterior surface corresponds with the exterior surface of the felly, and there are no projecting parts therefrom. The wedge form brings the greatest strength in the center and in line with the joint in the felly, where the greatest strain comes, and it is therefore stronger than the thin ordinary clip. The wedge being thick in the center, also gives sufficient depth for the tenon-hole, and by sinking the tenon into the body of the plate there is less strain upon the tenon than where the tenon rests in a socket outside the felly. The beveling or chamfering of the ends of the felly, and the fitting of the same to the reverse inclines of the plate, prevent the shucking of the ends of the felly together in passing over obstructions.

Having thus described my invention, I claim—

In a carriage-wheel, the combination, with the beveled ends of a felly, of the felly plate or clip consisting of the wedge-shaped body $d$ and thin-edged flanges $c\ c$, said body being thickest in the center in line with the joint of the felly and provided with the dovetailed hole $i$ to receive the tenon of the spoke, and the flanges being secured to the felly by the cross rivet or bar $g$, as shown and described, and for the purpose specified.

In witness whereof I have hereunto signed my name in the presence of two subscribing witnesses.

O. C. ROSS.

Witnesses:
R. F. OSGOOD,
Z. L. DAVIS.